United States Patent [19]
Coles et al.

[11] Patent Number: 5,994,807
[45] Date of Patent: Nov. 30, 1999

[54] ELECTRIC ACTUATORS FOR VEHICLE POWERED STEERING SYSTEMS

[75] Inventors: Jeffrey Ronald Coles; Anthony Johnson, both of West Midlands; Mark Anthony Wilkes, Birmingham, all of United Kingdom

[73] Assignee: Lucas Industries Public Limited Company, West Midlands, United Kingdom

[21] Appl. No.: 09/068,784

[22] PCT Filed: Nov. 14, 1996

[86] PCT No.: PCT/GB96/02803

§ 371 Date: May 15, 1998

§ 102(e) Date: May 15, 1998

[87] PCT Pub. No.: WO97/18120

PCT Pub. Date: May 22, 1997

[30] Foreign Application Priority Data

Nov. 16, 1995 [GB] United Kingdom .................. 9523369
Jul. 22, 1996 [GB] United Kingdom .................. 9615316

[51] Int. Cl.⁶ .................................................. H02K 7/06
[52] U.S. Cl. ............................................................. 310/83
[58] Field of Search ................................. 310/83, 78, 99; 74/7 C

[56] References Cited

U.S. PATENT DOCUMENTS

| | | | |
|---|---|---|---|
| 3,660,704 | 5/1972 | Pain et al. | 310/80 |
| 4,808,869 | 2/1989 | Kopp | 310/78 |
| 4,987,788 | 1/1991 | Bausch | 310/83 |
| 5,023,213 | 6/1991 | Isozumi | 310/88 |

FOREIGN PATENT DOCUMENTS

| | | |
|---|---|---|
| 0 180 120 | 5/1986 | European Pat. Off. . |
| 43 32 323 A1 | 3/1995 | Germany . |
| 7-13137644 | 5/1995 | Japan . |

*Primary Examiner*—Nestor Ramirez
*Assistant Examiner*—Joseph Waks
*Attorney, Agent, or Firm*—Christensen O'Connor Johnson & Kindness PLLC

[57] ABSTRACT

An electric actuator for use in a vehicle power steering system includes an electric motor (20) and a gearbox (22). The electric motor (20) has a stator (26) and an armature (27) concentric with the stator (26) that is adapted to rotate about a common axis. A single common output shaft (40) extends through the actuator (14) to transmit torque from the motor (20) to a drive portion (70) of the output shaft (40) remote from the gearbox (22), from whence torque is transmitted to the gearbox (22) through a transmission portion (60) of the shaft (40). A clutch (21) may be provided between the motor (20) and the output shaft (40).

6 Claims, 6 Drawing Sheets

ELECTRIC ACTUATORS FOR VEHICLE POWERED STEERING SYSTEMS

This is a United States national application corresponding to copending international application No. PCT/GB96/02803, filed Nov. 14, 1996, which designates the United States, the benefit of the filing date of which is hereby claimed under 35 U.S.C. § 120, which in turn claims the benefit of British application No. 9523369.8, filed Nov. 16, 1995, and No. 9615316.2, filed Jul. 22, 1996 the benefit of the filing date of which is hereby claimed under 35 U.S.C. § 119.

This invention relates to electric actuators for vehicle power steering systems of the kind comprising a combination of two component assemblies comprising an electric motor, and a gearbox.

In known electric actuators of the kind set forth such as disclosed, for example, in EP-A-0 055 870 and EP-A-0 411 600, the two component assemblies are consecutively arranged in order. A clutch, in the form of an electromagnetic friction clutch, may be disposed between the motor and the gearbox and with the assemblies coupled together but sealed from each other in terms of both magnetic shielding and sealing from dirt and lubricants. Additionally the components comprising the sub-assemblies are mounted around a shaft or shafts which, with such a consecutive approach, produces alignment and concentricity problems between the individual components of the assemblies, and between the assemblies themselves. Also arranging the assemblies consecutively produces an overall actuator package of large proportions.

We are aware of JP-A-7 137 644 which discloses an electric actuator in which a single common output shaft extends completely through a motor armature and a part of the gearbox is adopted to break when excessive torque is generated to eliminate the need for a clutch assembly. This document has been used as the basis for the pre-characterising portion of claim 1.

According to one aspect the invention provides an electric actuator adapted for use in a vehicle power steering system, comprising an electric motor and a gearbox, the electric motor comprising a stator and an armature concentric with the stator and adapted to rotate about a common axis, and in which a single common output shaft is provided, characterised, in that the output shaft extends only part of the way through the armature of the actuator from the gearbox end of the motor to transmit torque from the motor to a drive portion of the shaft and from whence torque is transmitted to the gearbox through a transmission portion of the shaft.

The output shaft may be supported in two spaced bearings which span the transmission portion of the shaft and with the armature being supported in a cantilever manner.

The use of a common shaft has the advantageous effect of reducing the mass of the motor as well as reducing the package width with a considerable reduction in cost. It also overcomes the problems of aligning the motor with the gearbox.

Preferably, the drive portion of the output shaft may extend through the armature of the motor. The output shaft can thus provide support along the axial length of the armature. Alternatively, the drive portion of the output shaft may be shorter and only extend part of the way through the armature from the gearbox end of the motor. In the latter case, the end of the armature adjacent the gearbox housing may be fixed against relative to the output shaft, and the opposite end of the armature may be supported in an end frame which is adapted to rotate around a bearing bevelled to the master casing. The end frame provides support for the end of the armature furthest from the gearbox and helps to keep the armature and motor stator concentric with one another.

Conveniently, the armature of the motor is secured on a section of the drive portion of the output shaft. The armature may preferably be splined or keyed to the output shaft so as to prevent relative rotation between the two.

Where the output shaft extends all the way through the armature, the armature may be fixed relative to the output shaft only at the end of the armature adjacent the gearbox or along the whole length of the shaft or at both ends of the shaft.

In another preferred arrangement, the output shaft may have a reduced diameter along a length between the ends of the armature. This is advantageous in that it reduces the weight of the common output shaft and thus reduces overall actuator weight when compared to a shaft which does not have such a reduced diameter.

In another construction a clutch may be provided which is disposed between the motor and the transmission portion of the output shaft, and the clutch, when engaged, transmits drive torque between the armature and the output shaft, both in a driving and a driven sense.

The clutch may be disposed at the end of the electric motor remote from the gearbox, with the transmission portion of the shaft extending through the motor.

By arranging for the clutch to be disposed at the end of the motor remote from the gearbox enables us to seal the components of the electro-magnetic sub-assemblies from the mechanical elements of the gearbox.

The clutch may be located in the recess in the end of a housing for the motor with the material of the recess acting to shield the coil of the clutch from the coil of the motor.

Preferably the clutch comprises a clutch of the dog type in which a dog clutch member keyed to the shaft against relative angular movement is axially moveable against the force in the return spring to couple the armature of the motor to the drive portion of the shaft in response to axial movement of a non-rotatable clutch armature.

Utilising a dog clutch reduces the size of the assembly and its power requirements in comparison with an electro-magnetic friction clutch.

When the clutch is disposed at the end of the motor remote from the gearbox it may be enclosed within a cover plate secured to the adjacent end of the housing of the motor. This forms another aspect of our invention. The cover plate may be disposed within an air flow to facilitate cooling, and such cooling may be increased by the provision of vanes on the cover. By making the cover plate detachable the clutch can be serviced without dismantling other parts of the actuator.

Several embodiments of our invention are illustrated in the accompanying drawings in which.

Figure 1:
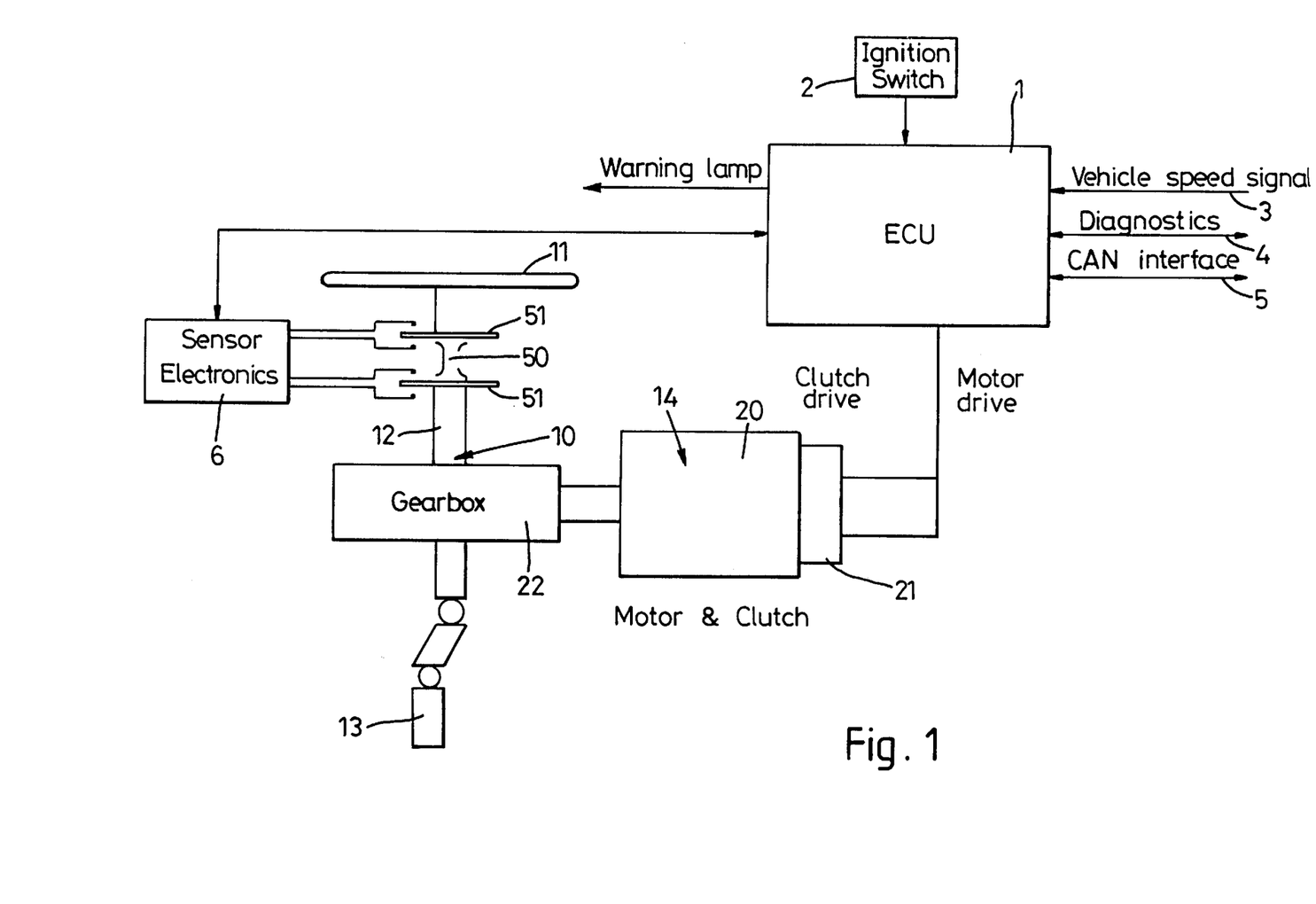
FIG. 1 is a layout of an electric actuated power assisted steering system for a vehicle.

In the system illustrated in the layout of FIG. 1 an electronic control unit 1 is adapted to receive signals from an ignition switch 2, vehicle speed signalling means 3, diagnostic means 4, CAN interface means 5, and torque sensor electronic means 6. The electronic control unit 1 operates on the various signals and emits an energising current to control the power assistance applied to a steering mechanism 10.

As illustrated a steering wheel 11 controls the operation of a steering linkage 13 through a column shaft 12. The torque applied to the column shaft 12 is augmented by an electric actuator 14 under the control of the energising current from the electronic control unit 1.

Figure 2:
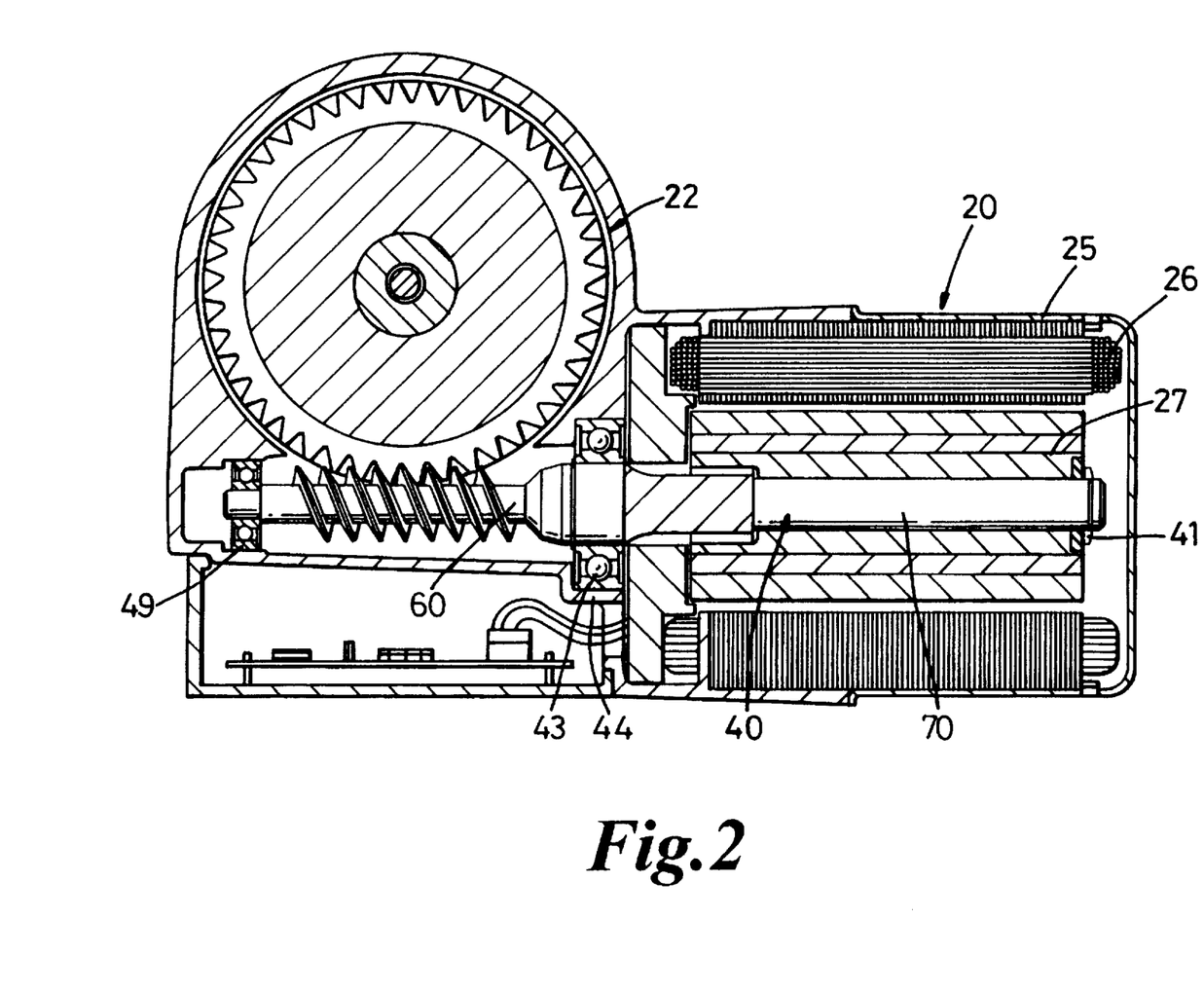
FIG. 2 is a view of a first preferred embodiment of an electric actuator for the system of FIG. 1 including a longitudinal section through an electric motor.

A first embodiment of the electric actuator 14 is shown in detail in FIG. 2, and comprises two component assemblies consisting of an electric motor 20 and a gearbox 22.

The electric motor 20 comprises a cylindrical housing 25 in which is housed a coil defining a stator 26, and a rotatable armature defining a rotor 27. The end of the housing 25 remote from the gearbox 22 includes an end cap or cover plate 42 which is, optionally, detachably secured to a wall at the end of the housing 25.

A single common output shaft 40 is provided having a drive portion 70 which is secured to the armature of the motor so as to prevent relative rotation. The shaft 40 has a transmission portion which extends from the motor and through the gearbox 22 and is journaled for rotation at its free end in a bearing 49. A second bearing 43 is also provided at the point where the output shaft 40 extends through the wall of the gearbox housing.

Returning to FIG. 1, the torque in the column shaft 12 at opposite ends of a portion of reduced diameter or quill shaft 50 is determined by a pair of indicator disks 51 and 52 from which the sensor electronic means 6 receives a signal. Such an arrangement is typically shown in our EP application 93300792.4.

When the system is in an operative position, i.e. in which the ignition switch 2 is in an "on" position, power is supplied to the electronic control unit. When the steering wheel 11 is operated a signal from the sensor 6 is recognised by the electronic control unit 1 which, in turn, emits an energising current to energise the stator 26 and cause rotation of the armature 27. Since the armature is secured relative to the drive portion 70 of the output shaft 40 to prevent relative rotation between the two, that rotation is transmitted through the transmission portion 60 of the shaft 40 in the gearbox 22, in turn to augment the torque applied manually to the column shaft 12 from the steering wheel 11.

Since the gearbox 22 is spaced from an assembly comprising the motor 20, we are able to separate the electromagnetic components of the assembly from the mechanical components defined by the gearbox 22. Furthermore, because the drive portion 70 and transmission portion 60 are part of a common shaft 40, alignment problems are eliminated and the bulk of the system is reduced.

Figure 3:
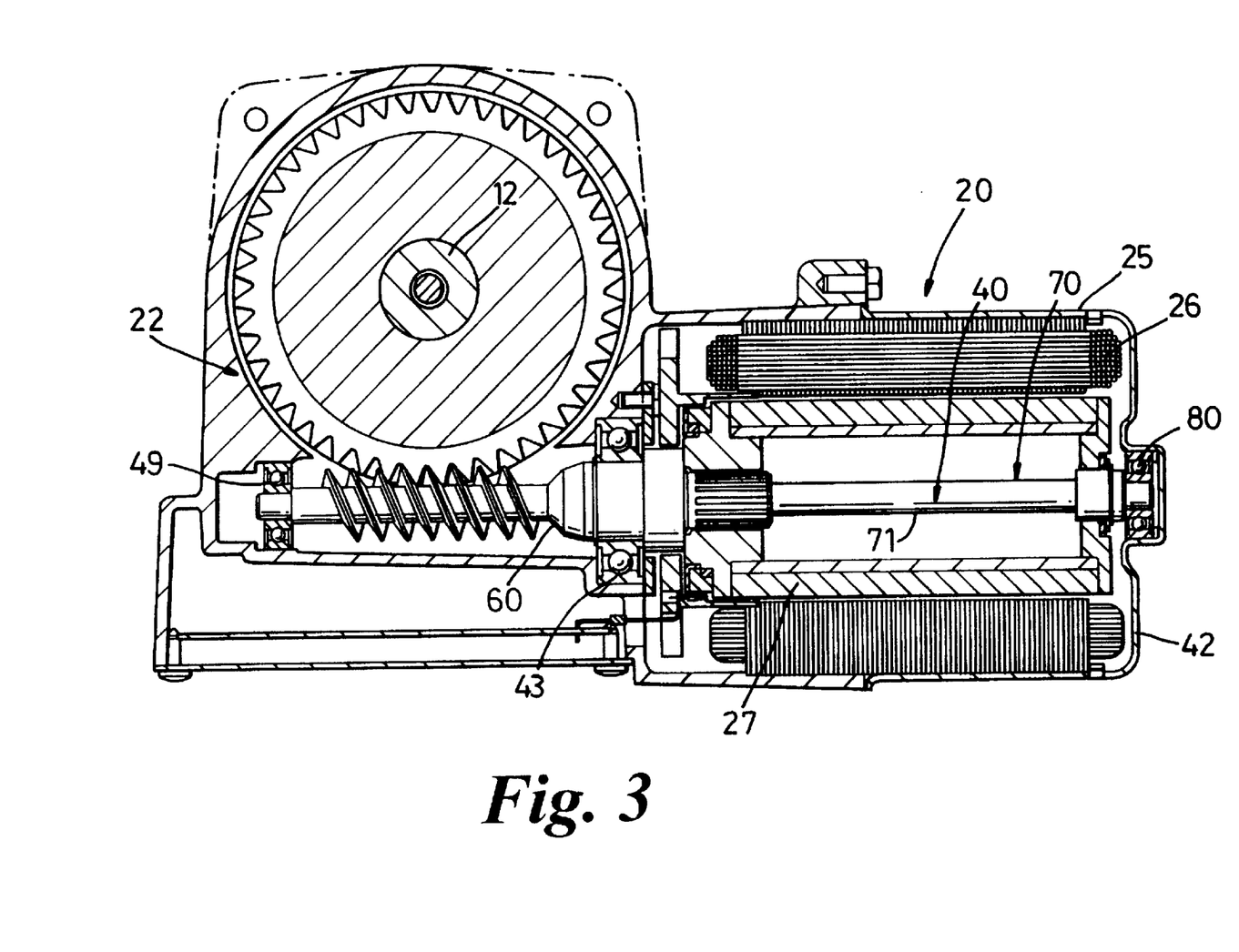
FIG. 3 is a view of a second embodiment of an electric actuator.
Figure 4:
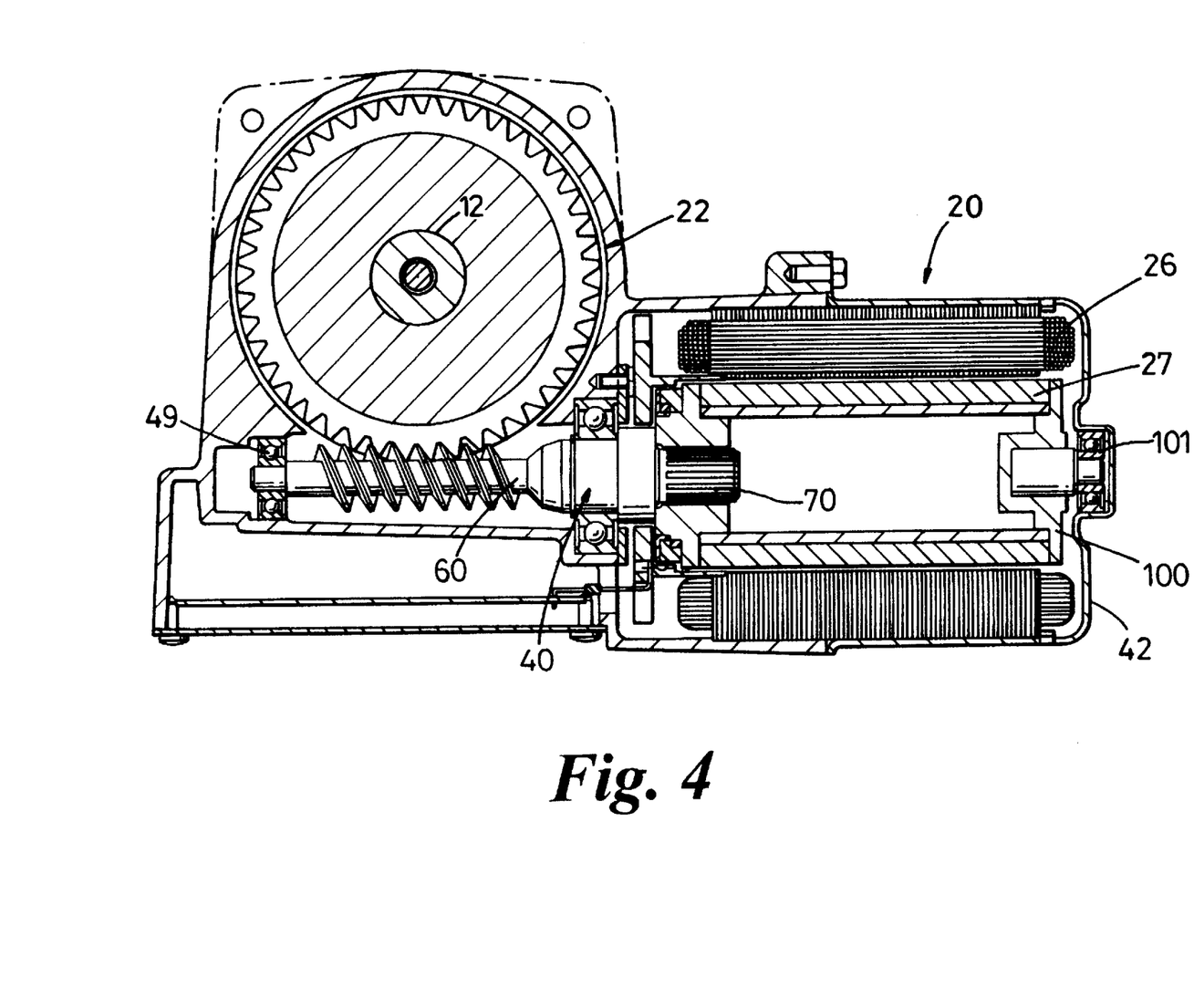
FIG. 4 is a view of a third embodiment of an electric actuator.

FIGS. 3 and 4 illustrate two further embodiments of electrical actuators in accordance with the present invention in which a common shaft 40 is employed. In FIG. 3, a portion 71 of the output shaft 40 intermediate the ends of the rotor/armature 27 of the motor is of a reduced diameter. The armature is supported at either end of the reduced diameter section 71, i.e. at its end nearest the gearbox and at its end furthest from the gearbox. It is however, only journaled to the output shaft 40 at the end nearest the gearbox. The output shaft is in turn supported at the end furthest from the gearbox by the bearing 80. This reduced diameter section helps to keep the weight of the assembly to a minimum. Furthermore, the reduced section of the output shaft is structurally reinforced by the armature to prevent it from flexing or twisting under load.

In FIG. 4, the drive portion 70 of the shaft 40 has been considerably shortened when compared to FIG. 2 or FIG. 3. In this embodiment, the output shaft 40 is only of sufficient length to extend from the gearbox housing 22 and engage with one end of the rotor 27, i.e. the end of the armature adjacent the gearbox housing. In this embodiment if the armature was only supported by the output shaft 40 at one end, the free end of the armature could flex under load. To prevent this, the end of the armature remote from the gearbox is supported by an end frame assembly 100 which is journaled for rotation on a bearing 101 mounted in the end cap 42 of the motor housing 25.

Figure 5:
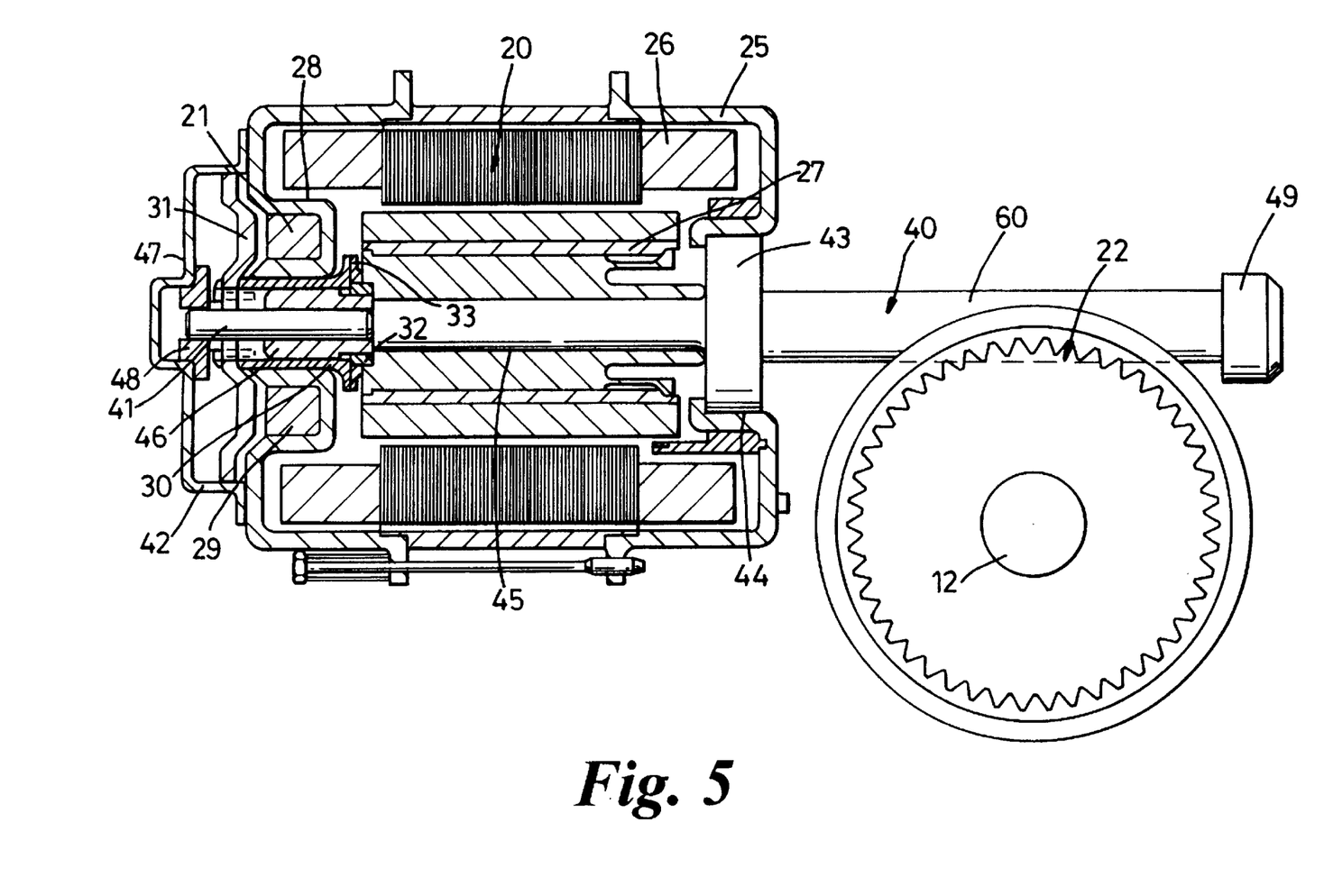
FIG. 5 is a view of another embodiment of an electric actuator for the system of FIG. 1 including a longitudinal section through an electric motor and electromagnetic clutch assembly.
Figure 6:
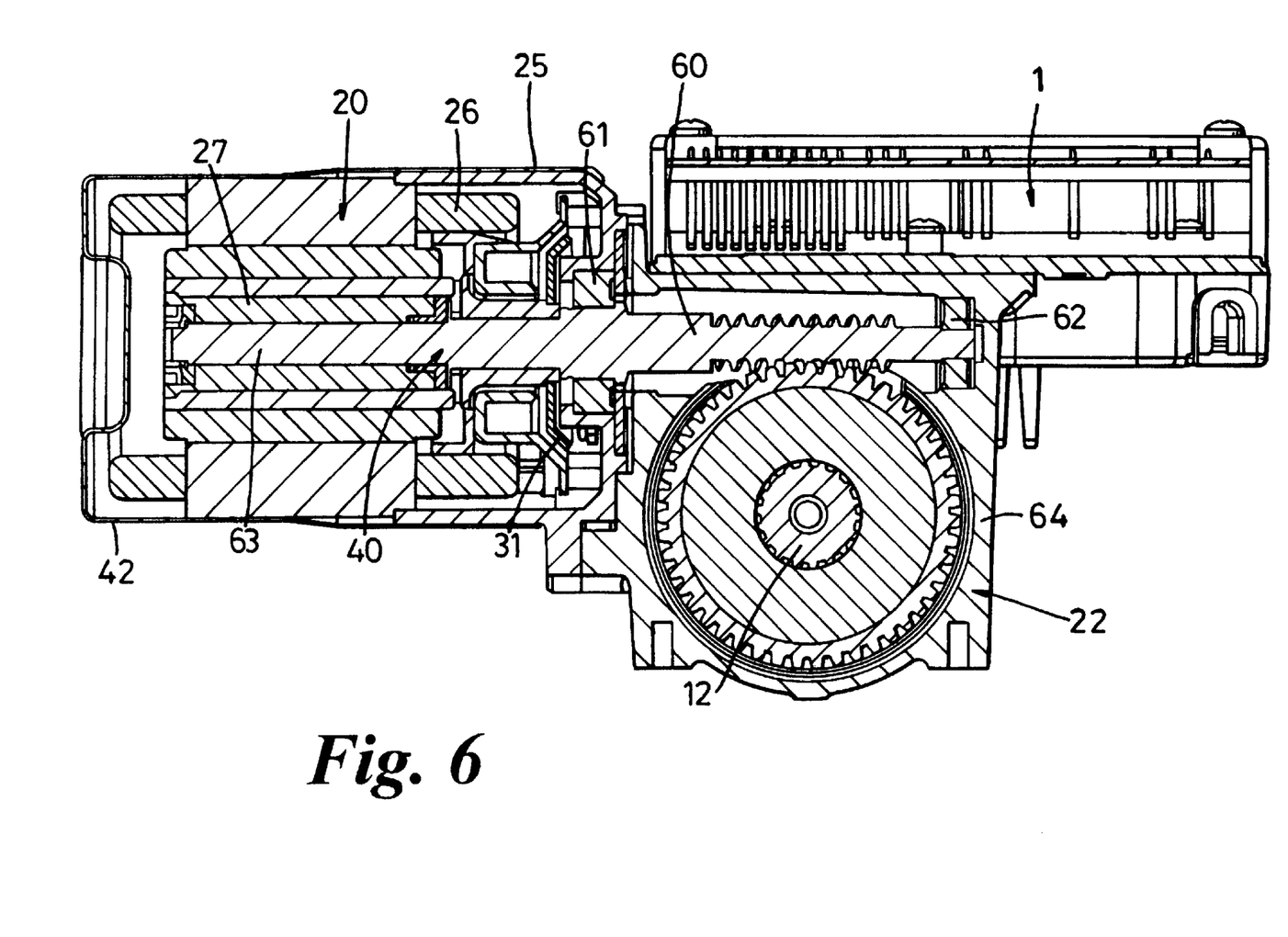
FIG. 6 is a view of another embodiment similar to that shown in FIG. 5 but including a longitudinal section through a further modified motor and electromagnetic clutch assembly.

FIGS. 5 and 6 show two further embodiments of an actuator, but in each case the armature is connected to the drive portion 70 of the output shaft 60 through a clutch 21 so that the actuator comprises three component assemblies comprising an electric motor 20, an electromagnetic clutch 21, and a gearbox 22.

As illustrated in FIG. 5, the electromagnetic clutch 21 comprises an annular coil 29 which is located within an annular recess 28 provided in the end of the housing 25 remote from the gearbox 22. The wall of the housing 25 defining the recess 28 provides magnetic shielding between the stator 26 and the coil 29. A rotatable dog clutch member 30 is axially movable in response to axial movement of a clutch armature 31 against the force in a biasing spring in the form of a Belleville or spring washer 32 to form a coupling drive engagement with a plurality of angularly spaced dog apertures 33 in the adjacent end of the armature 27.

The output shaft 40 is journaled for rotation at one end in a bearing 41 housed within a cover plate 42 which encloses the clutch armature 31. The shaft 40 is also journaled for rotation at an intermediate point in its length in a bearing 43 retained within an opening 44 in a wall at the opposite end of the housing. A portion of the shaft 40 inboard of the bearing 43 defines a plane bearing 45 on which the armature 27 is journaled for rotation.

The clutch member 30 is keyed to the shaft 40 on a splined member 46 secured to the shaft 40, and the clutch armature 31 is secured to the shaft 40 by means of a retainer 47. The portion of the shaft 48 carrying the splined portion 46 comprises an end drive portion.

In an inoperative position illustrated in the drawings in which the ignition switch 2 is in an "off" position, and with the vehicle stationary the clutch 21 is disengaged with the dog clutch member 30 spaced from the clutch face 33 by means of the spring washer 32. When the ignition switch 2 is switched on the electronic control unit 1 sends an energising current to the coil 29 of the clutch 21 which, in turn moves the clutch armature 31 axially to cause the teeth on the clutch member 30 to engage the apertures 30 in the armature 27 of the motor 20.

Since the clutch is now engaged, the armature is fixed relative to the drive portion of the output shaft and the activator operates in the same way as described for the embodiments shown in FIGS. 2 to 4. Thus, rotation of the armature is transmitted through the drive portion of the output shaft 40 and in turn through the transmission portion of the output shaft 40 to the gearbox 22 to augment the torque applied to the column shaft 12 from the steering wheel 11.

Also, because the clutch is spaced from the gearbox 22, the electro-magnetic and mechanical components defined by the gearbox 22 are separated. Furthermore, by locating the electro-magnetic clutch 21 at the end of the housing 25 remote from the gearbox 22 enables the clutch 21 to be serviced, simply by removing the end cover 42 and without dismantling any other part of the assembly.

When the assembly 14 is installed in the vehicle it is preferable that the end cover 42 is located in a position within an air flow. This facilitates cooling of the clutch 21. Such cooling may be increased by the application of vanes (not shown) to the end cover 42.

In the actuator shown in FIG. 6 of the accompanying drawings, the electromagnetic clutch 21 is disposed between the inner end of the motor 20 and the transmission portion 60 of the output shaft 40.

The transmission portion 60 of the shaft 40 is supported in two spaced inner and outer bearings 61 and 62, with a section 63 extending axially relatively away from the gearbox 22 in a cantilever manner to define a support on which the armature 27 is supported for relative rotation. The electronic control unit 1 is marked on a housing 64 of the gearbox 22.

The construction and operation of the actuator of FIG. 6 is otherwise the same as that of FIG. 1 and FIG. 5.

We claim:

1. An electric actuator adapted for use in a vehicle power steering system, comprising an electric motor and a gearbox, said electric motor comprising a stator and an armature concentric with said stator and adapted to rotate about a common axis, and a single common output shaft having a drive portion and a transmission portion, wherein said output shaft extends only partially through said armature from an end of said motor adjacent said gearbox to transmit torque from said motor to said drive portion of said shaft and from whence torque is transmitted to said gearbox through said transmission portion of said shaft.

2. An electric actuator according to claim 1 in which said gearbox has a housing, said motor has a casing, and an end of the armature nearest said gearbox housing is fixed relative to said drive portion of said output shaft, an opposite end of said armature being supported in an end frame which is journaled to a bearing mounted on said motor casing.

3. An electric actuator according to claim 1 in which said output shaft is supported in two spaced bearings which span said transmission portion of said shaft and with said armature being supported in a cantilever manner.

4. An electric actuator according to claim 1 in which said armature is slidably connected to drive portion of said output shaft.

5. An electric actuator according to claim 1, in which a clutch is provided which is disposed between said motor and said transmission portion of said output shaft, and said clutch, when engaged, transmits drive torque between said armature and said output shaft.

6. An electric actuator according to claim 5, in which said clutch comprises dog type having a non-rotatable clutch armature and a dog clutch member keyed to said shaft against a relative angular movement is axially movable against a force in a return spring to couple said armature of said motor to said drive portion of said shaft in response to an axial movement of a said clutch armature.

* * * * *

UNITED STATES PATENT AND TRADEMARK OFFICE
CERTIFICATE OF CORRECTION

PATENT NO. : 5,994,807
DATED : November 30, 1999
INVENTOR(S) : J.R. Coles et al.

It is certified that error appears in the above-identified patent and that said Letters Patent is hereby corrected as shown below:

COLUMN        LINE 6             25           after "dog type" insert --clutch--
(Claim 6,     line 2)

Signed and Sealed this

Thirteenth Day of February, 2001

Attest:

NICHOLAS P. GODICI

Attesting Officer        Acting Director of the United States Patent and Trademark Office